Jan. 6, 1970     S. E. COBLITZ     3,487,543
CAM-CHAIN MEANS FOR CUTTING PIPE
Filed Dec. 8, 1967
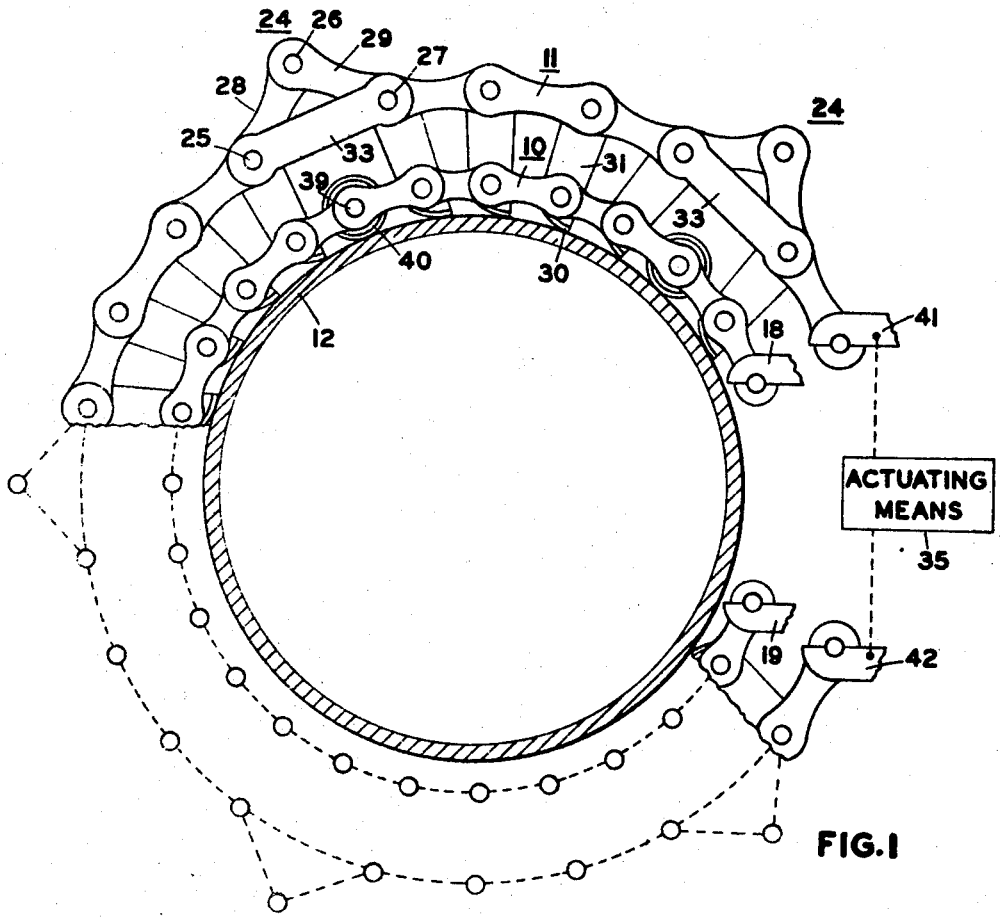
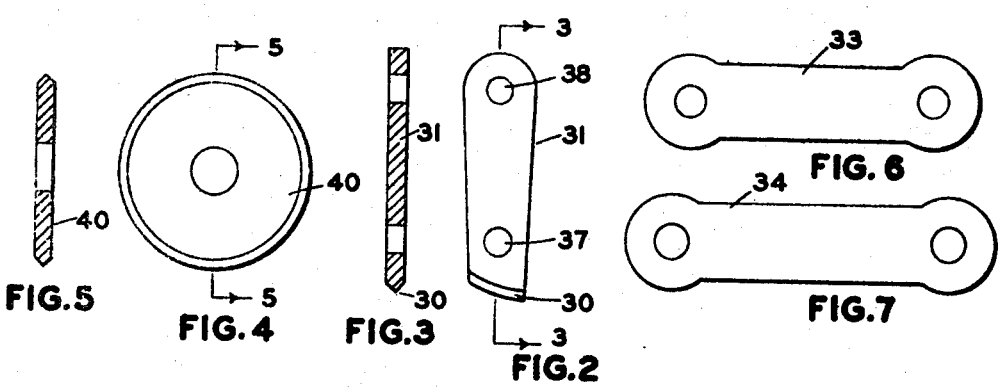
INVENTOR.
SANFORD E. COBLITZ
BY
*Hoodling, Krost, Granger and Rust*
attys.

United States Patent Office 3,487,543
Patented Jan. 6, 1970

3,487,543
CAM-CHAIN MEANS FOR CUTTING PIPE
Sanford E. Coblitz, 567 Knollwood Ave.,
Ashtabula, Ohio 44004
Filed Dec. 8, 1967, Ser. No. 689,048
Int. Cl. B23d *21/06;* B26d *3/16*
U.S. Cl. 30—100                                           4 Claims

ABSTRACT OF THE DISCLOSURE

Subject disclosure relates to cam-chain means for cutting pipe and features a first and a second chain. The first chain is disposed to be squeeze-drawn about a pipe and is provided with cam cutting elements for cutting into the pipe to sever same. The cam cutting elements are provided with outwardly extending actuating arms. The second chain substantially encircles the first chin and is connected at spaced circumferential intervals to the outwardly extending actuating arms, whereby the cam cutting elements are actuated for cutting into the pipe to sever same upon relative circumferential movement between the two chains. The second chain is disposed to be provided with fixedly adjustable kinks at circumferentially spaced intervals, whereby the effective length thereof may be varied relative to the length of the first first chain for accommodating the cutting of pipe of different diameters.

---

My invention relates to chain means for cutting pipe and more particularly to chain means having cam cutting elements for cutting into the pipe to sever same.

An object of my invention is to provide for mounting cam cutting elements upon a first chain squeeze-drawn about a pipe and for actuating the cam cutting element for cutting into the pipe by a second chain circumferentially movable relative to the first chain.

Another object is to vary the effective length of the second chain relative to that of the first chain to accomodate the cutting of pipes of different diameters.

Another object is to provide fixedly adjustable kinks in the second chain at spaced circumferential intervals whereby the effective length thereof may be varied relative to the length of the first chain.

Other objects and a fuller understanding of the invention may be had by referring to the following description and claims, taken in conjunction with the accompanying drawings, in which:

FIGURE 1 is a diagrammatic illustration of cam-chain means embodying my invention;

FIGURE 2 is a side view of a cam cutting element;

FIGURE 3 is a cross-sectional view of the cam cutting element, taken along the line 3—3 of FIGURE 2;

FIGURE 4 is a side view of a circular cutting element;

FIGURE 5 is a cross-sectional view of the circular cutting element, taken along the line 5—5 of FIGURE 4;

FIGURES 6 and 7 are side views of adjusting links.

With reference to the drawings, my cam-chain means comprises generally a first chain 10, and a second chain 11, mounted around a pipe 12 to be cut. The first chain 10 may be of standard construction and comprises a plurality of side links connected together by cross-pins which preferably extend laterally beyond the side links. The first chain 10 is disposed to be squeeze-drawn about the pipe 12 by any suitable means, diagrammatically illustrated by opposed clamping jaws 18 and 19 engaging selectable cross-pins of the chain. In accordance with standard practice, the opposing clamping jaws 18 and 19 may be actuated toward each other by a pair of levers or by hydraulic means (not shown). As the opposed clamping jaws 18 and 19 are drawn together, the first chain is drawn tightly against the pipe 12, preparatory to the operation of the second chain which substantially encircles the first chain.

The second chain may be of standard construction and comprises a plurality of side links connected together by cross-pins which preferably extend laterally beyond the the side links. At spaced circumferential intervals, the second chain is preferably provided with fixedly adjustable kinks, designated by the reference character 24 which may be employed to vary the effective length of the second chain relative to that of the first chain to accommodate the cutting of pipes of different diameters. For example, in cutting pipe ranging in diameters from 14–18 inches, the length of the second chain relative to that of the first chain is such that the first chain can be wrapped around the pipe. When making a change for cutting pipe ranging in diameters from 10–14 inches, the relative length of the second chain with respect to that of the first chain needs to be increased so that the first chain can be wrapped around the smaller ranges of pipe. Each fixedly adjustable kink 24 includes first, second and third cross-pins 25, 26 and 27, and side link means 28 and 29, with said side link means 28 disposed between the cross-pins 25 and 26 and with the side link means 29 disposed between the cross-pins 26 and 27. A pair of secondary links 33, on of which is shown in FIGURE 6, is mounted on opposite side of and between the cross-pins 25 and 27. The secondary links 33 are disposed to shorten the effective length of the second chain relative to that of the first chain, when cutting pipe ranging, for example, from 14–18 inches in diameter. FIGURE 7 shows a secondary link 34 which may be longer than that of FIGURE 6. By substituting the secondary link 34 for the secondary link 33, the effective length of the second chain may be increased relative to that of the first chain for cutting pipe ranging for example, in diameters from 10–14 inches. When the second chain is at its full length (without kinks 24) it may be used to cut pipe ranging, for example, in diameters from 6–10 inches.

Mounted between the first and second chain are a plurality of cam cutting elements 30, each having an actuating arm 31, see FIGURES 2 and 3. The actuating arm 31 has an opening 37 through which a cross-pin of the first chain extends and has an opening 38 through which a cross-pin of the second chain extends. As the second chain is circumferentially moved relative to the first chain, the cam cutting elements 30 cut into the pipe to sever same. Preferably, the cross-pins 39 of the first chain which are substantially radially inwardly of the cross-pins 26 of the second chain, are provided with circular cutting elements 40, see FIGURES 4 and 5.

In operation, the second chain may be circumferentially moved relative to the first chain by any suitable means, diagrammatically illustrated by actuating means 35 comprising opposed clamping jaws 41 and 42. The clamping jaws 41 and 42 are disposed to move as a unit in a circumferential direction about the pipe and in doing so the entire second chain 11 is moved circumferentially relative to the first chain 10. Upon relative circumferential movement in a clockwise direction, the cam cutting elements 30 cut into the pipe for severing same.

Accordingly, my invention is disposed to cut pipe of different diameters by employing the fixedly adjustable kinks. As shown in FIGURE 1, the fixedly adjustable kinks are preferably located at circumferential intervals of five cross-pins, although they may be located at any other suitable interval. Also, by means of the fixedly adjustable kinks, the actuating arms 31 are disposed to be operated through a favorable tiltable range. Thus, in FIGURE 1, the actuating arms 31 are substantially radially disposed, whereby the sweep through which they are operated comprises a most favorable range of operation. The sections of the second chain between the fixedly adjustable kinks 24 are substantially duplicates of each other, whereby the operation of each section is substantially the same.

Although this invention has been described in its preferred form with a certain degree of particularity, it is understood that the present disclosure of the preferred form has been made only by way of examples and that numerous changes in the details of construction and the combination and arrangement of parts may be resorted to without departing from the spirit and scope of the invention as hereinafter claimed.

What is claimed is:

1. Cam-chain means for cutting a pipe, said chain means comprising first and second chains, means for are operated comprises a most favorable range of opera-squeeze-drawing said first chain about said pipe, cam cutting elements provided on said first chain for cutting into said pipe, said cam cutting elements respectively having actuating arms, said actuating arms extending outwardly from said first chain, said second chain disposed about said first chain and connected at spaced intervals to said actuating arms, and means for circumferentially moving said second chain relative to said first chain to actuate said actuating arms for camming said cutting elements into said pipe for cutting same.

2. The structure of claim 1, having means for varying the relative effective length of said chains relative to each other.

3. The structure of claim 1, having means at spaced intervals for varying the effective length of said second chain relative to that of said second chain relative to that of said first chain.

4. The structure of claim 1, wherein said second chain has a series of first, second and third connecting pins with said first link means between said first and second pins and with second link means between said second and third pins, and secondary link means for engaging said first and third pins of each series for fixedly adjusting the space therebetween with said first and second link means defining an outwardly extending kink.

References Cited

UNITED STATES PATENTS

| | | | |
|---|---|---|---|
| 2,433,606 | 12/1947 | Gill | 30—100 |
| 2,502,825 | 4/1950 | Coburn | 30—92 |
| 2,962,814 | 12/1960 | Gill | 30—100 |

ROBERT C. RIORDON, Primary Examiner

J. C. PETERS, Assistant Examiner